Feb. 15, 1966 C. V. CORN 3,234,587
ROTARY DRUM TYPE CHICKEN PICKING MACHINE
Filed June 5, 1963 5 Sheets-Sheet 1

INVENTOR.
CHARLES V. CORN
BY
Newton, Hopkins & Jones
ATTORNEYS

Feb. 15, 1966  C. V. CORN  3,234,587
ROTARY DRUM TYPE CHICKEN PICKING MACHINE
Filed June 5, 1963  5 Sheets-Sheet 2

INVENTOR.
CHARLES V. CORN
BY
Newton, Hopkins & Jones
ATTORNEYS

Feb. 15, 1966  C. V. CORN  3,234,587
ROTARY DRUM TYPE CHICKEN PICKING MACHINE
Filed June 5, 1963  5 Sheets-Sheet 3

INVENTOR.
CHARLES V. CORN
BY
Newton, Hopkins & Jones
ATTORNEYS

Feb. 15, 1966  C. V. CORN  3,234,587
ROTARY DRUM TYPE CHICKEN PICKING MACHINE
Filed June 5, 1963  5 Sheets-Sheet 5

INVENTOR.
CHARLES V. CORN
BY
Newton, Hopkins & Jones
ATTORNEYS

United States Patent Office 3,234,587
Patented Feb. 15, 1966

3,234,587
ROTARY DRUM TYPE CHICKEN
PICKING MACHINE
Charles V. Corn, Gainesville, Ga., assignor to Gainesville Machine Co. Inc., Gainesville, Ga., a corporation of Georgia
Filed June 5, 1963, Ser. No. 285,745
11 Claims. (Cl. 17—11.1)

This invention relates to a rotary drum type chicken picking machine and more particularly to a machine for removing the feathers on the hocks of a chicken or other fowl.

Rotary drum type chicken picking machines are well known in the art. These previous machines customarily employ a plurality of parallel rotary drums having a plurality of flexible rubber picking fingers extending from the periphery thereof to accomplish the removal of feathers from a chicken suspended head down from a shackle carried by a conveyor belt. These previous machines have in most cases effectively removed feathers from most portions of the body of a bird. However, these previous machines have not removed feathers from the hocks, shoulders and neck of a chicken in a completely satisfactory manner.

The invention described herein will remove feathers from the hocks, shoulders, and neck of a chicken in a completely satisfactory manner. This is accomplished without the use of clamping means for holding the head of the chicken and by a machine which takes a minimum of floor space and which is easy and convenient to operate. The invention has a plurality of flexible rubber picking fingers rotating in substantially vertical planes so as to engage the neck and shoulders of the chicken and completely remove all feathers from these portions of the chicken's body. These picking fingers also urge the body of the chicken downward away from a conveyor belt and insure that the chicken remains properly positioned within the machine. In addition, the invention has a plurality of rubber picking fingers rotating in substantially horizontal planes so as to engage the hocks of the chicken and completely remove all feathers from this portion of the chicken's body.

These and other features and advantages of the invention will be more clearly understood from the following detailed description and the accompanying drawings in which like characters of reference designate correspnoding parts of all figures and in which.

Figure 1:
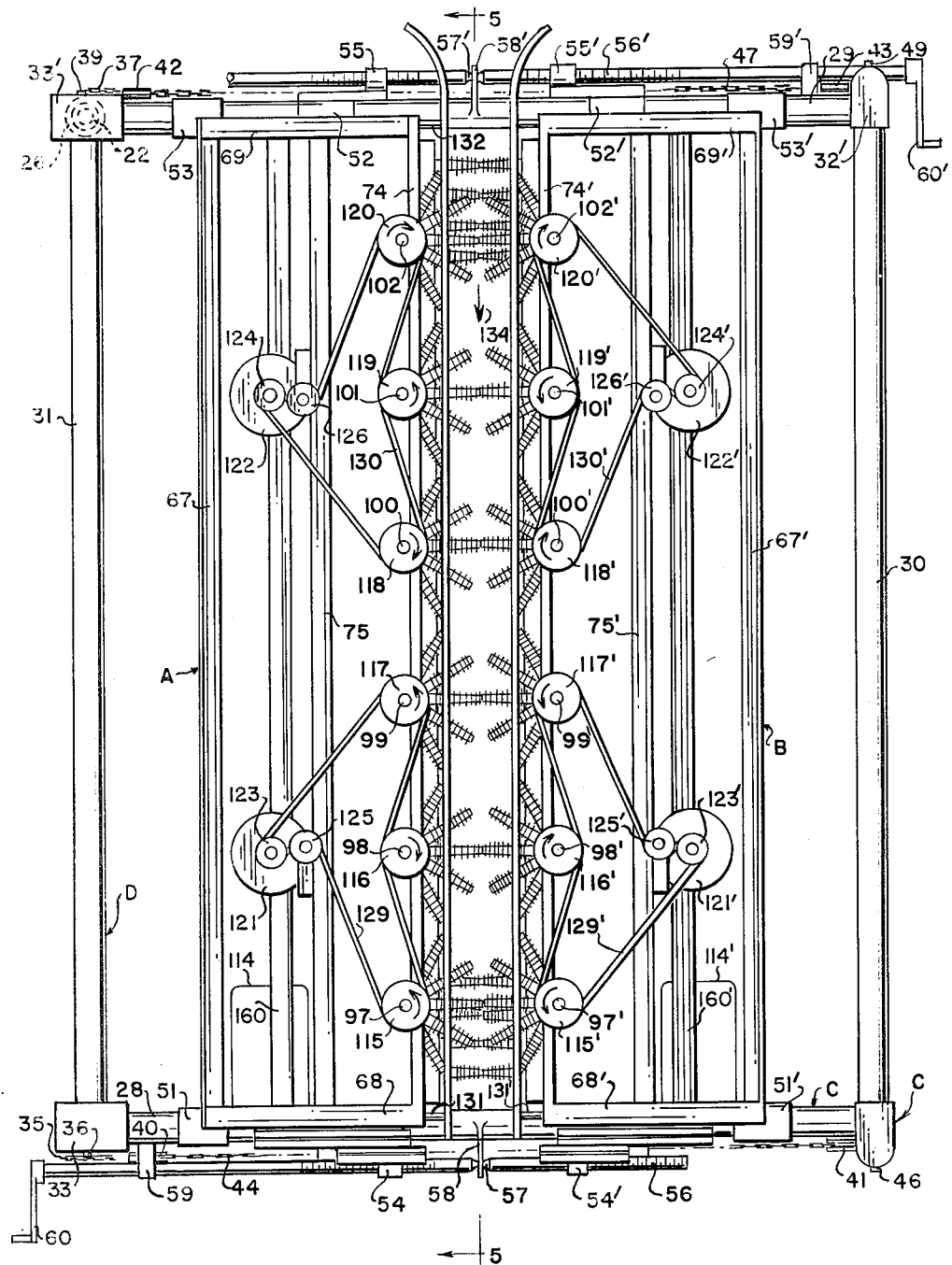
FIG. 1 is a top plan view of the chicken picking machine showing the two picking frames extending parallel to each other.

These figures and the following detailed description disclose a preferred specific embodiment of the invention, but the invention is not limited to the details disclosed since it may be embodied in other equivalent forms.

This invention is best understood as comprising a right picking frame generally indicated by the letter A, a left picking frame generally indicated by the letter B, and a main frame generally indicated by the letter C. The main frame C supports the right frame A and the left frame B in positions parallel to each other and the main frame C has vertical posts 20, 21, 22 and 23. A collar 24 is slidably positioned on the post 20, a collar 25 is slidably positioned on the post 21, a collar 26 is slidably positioned on the post 22, and a collar 27 is slidably positioned on the post 23. A first transverse member 28 extends horizontally between the collar 24 and the collar 25 and a second transverse member 29 extends horizontally between the collar 26 and the collar 27. Similarly, a first longitudinal member 30 extends horizontally between the collar 24 and the collar 27 and a second longitudinal member 31 extends horizontally between the collar 25 and the collar 26.

The collars 24, 25, 26 and 27, the transverse members 28 and 29 and the longitudinal members 30 and 31 form a carriage generally indicated by the letter D which is vertically adjustable by sliding the collars 24, 25, 26, and 27 along the lengths of the posts 20, 21, 22, and 23. A pad 32 is fixedly attached to the upper end of the post 20 and a pad 32' is fixedly attached to the upper end of the post 23.

A windlass 33 is fixedly attached to the upper end of the post 21 and windlass 33' is fixedly attached to the upper end of the post 22. The windlass 33 and the windlass 33' are provided with the customary prior art pawl and ratchet arrangement and the chain 35 on the pulley 34 of the windlass 33 is fixedly attached to an eyelet 36 extending from the collar 25. Similarly, the chain 37 on the pulley 38 of the windlass 33' is fixedly attached to the eyelet 39 extending from the collar 26. When the windlass 33 is operated in the customary manner the collar 25 is raised or lowered along the length of the post 21 and when the windlass 33' is operated in the customary manner, the collar 26 is raised or lowered along the length of the post 22.

A pulley 40 is fixedly mounted on the collar 25, a pulley 41 is fixedly mounted on the collar 24, a pulley 42 is mounted on the collar 26 and a pulley 43 is fixedly mounted on the collar 27. A first leveling chain 44 extends from an eyelet 45 fixedly positioned at the lower end of the post 21 and over the pulley 40, thence substantially parallel to the first transverse member 28 and under the pulley 41, and thence to a hook 46 extending below the pad 32. Similarly, a second leveling chain 47 extends from eyelet 48 fixedly positioned at the lower end of the post 22 and over the pulley 42, thence substantially parallel to the second transverse member 29 and under the pulley 43, and thence to a hook 49 extending below the pad 32'.

The first leveling chain 44 results in the collar 24 being raised and lowered along the length of the post 20 when the collar 25 is raised and lowered along the length of the post 21 by the action of the windlass 33. Similarly, the second leveling chain 47 results in the collar 27 being raised and lowered along the length of the post 23 when the collar 26 is raised and lowered along the length of the post 22 by the action of the windlass 33'. Thus, when the windlass 33 is operated, that end of the carriage D supported by the posts 20 and 21 is raised or lowered and when the windlass 33' is operated, that end of the carriage D supported by the posts 22 and 23 is raised or lowered. This carriage D motion resulting from the operation of the windlass 33 and the windlass 33' is used to adjust to the vertical position of the picking frames A and B supported by the main frame C.

The right picking frame A and the left picking frame B are supported parallel to each other between the first transverse member 28 and the second transverse member 29 by extending the first transverse member 28 through a block 50 and a block 51 fixedly attached to one end of the picking frame A and through a block 50′ and a block 51′ fixedly attached to the corresponding end of the picking frame B and by extending the second transverse member 29 through a block 52 and a block 53 fixedly attached to the second end of the picking frame A and through a block 52′ and a block 53′ fixedly attached to the corresponding end of the picking frame B. The blocks 50 and 51 are slidably movable along the length of the first transverse member 28 and the blocks 52 and 53 are slidably movable along the length of the second transverse member 29. Similarly, the blocks 50′ and 51′ are slidably movable along the first transverse member 28 and the blocks 52′ and 53′ are slidably movable along the second transverse member 29.

Thus, the picking frames A and B are laterally movable with respect to each other along the transverse members 28 and 29. Lateral motion of the picking frames A and B is provided by a lateral positioning mechanism comprising a tab 54 extending from the block 51, a tab 54′ extending from the block 51′, a tab 55 extending from the block 52 and a tab 55′ extending from the block 52′; a two segment screw 56 extending generally parallel to the first transverse member 28 through the tabs 54 and 54′; a two segment screw 56′ extending parallel to the second transverse member 29 through the tabs 55 and 55′.

The screw 56 has a scored portion 57 between its two segments and this scored portion 57 of the screw 56 extends through a bracket 58 fixedly attached to the midlength of the first transverse member 28 so as to prevent lateral motion of the screw 56. Similarly, the screw 56′ has a scored portion 57′ and this scored portion 57′ of the screw 56′ extends through a bracket 58′ attached to the midlength of the second transverse member 29 so as to prevent lateral motion of the screw 56′.

The screw 56 is of conventional known type with rotation of its first segment causing tab 54, the block 51, and the picking frame A to move toward or away from the picking frame B and rotation of its second segment causing an equal and opposite motion of the tab 54′, the block 51′ and the picking frame B. Similarly, the screw 56′ is of conventional known type with rotation of its first segment causing the tab 55, the block 52, and the picking frame A to move laterally with respect to the picking frame B and rotation of its second segment causing tab 55′, the block 52′, and the picking frame B to move laterally in an equal and opposite direction.

One end of the screw 56 is extended through a bracket 59 mounted on the first transverse member 28 adjacent to the collar 25 and the screw 56 is rotated by rotating a handle 60 attached to this end of the screw 56. Similarly, one end of the screw 56′ is extended through a bracket 59′ mounted on the second transverse member 29 adjacent to the collar 27 and the screw 56′ is rotated by rotating a handle 60′ attached to this end of the screw 56′. Thus, the positions of the picking frames A and B are vertically adjustable by changing the position of the carriage D with the windlass 33 and the windlass 33′ and horizontally adjustable by rotating the handle 60 and the handle 60′.

The right picking frame A and the left picking frame B are substantially mirror images of each other and the detailed description to follow will be restricted to the right picking frame A. However the part of the left picking frame B corresponding to each part of the right picking frame A described is indicated in the drawings by the prime of the reference number used for the right picking frame A and the construction of the left picking frame B will be readily understood from the description of the right picking frame A. The frame A has a lower member 61 at one end and a lower member 62 at its other end. A longitudinal member 63 extends between one end of the lower member 61 and the corresponding end of the lower member 62, and a longitudinal member 64 extends between the other end of the lower member 61 and the corresponding end of the lower member 62. It is to the lower member 61 that the blocks 50 and 51 are fixedly attached and it is to the lower member 62 that the blocks 52 and 53 are fixedly attached. Thus, the lower members 61 and 62 and the longitudinal members 63 and 64 form a rectangular base which is vertically movable with the transverse members 28 and 29 and laterally movable along the transverse members 28 and 29.

Extending vertically from one end of the longitudinal member 63 is a vertical member 65 and extending vertically from the other end of the longitudinal member 63 is a second vertical member 66. An upper member 67 extends between the extending end of the vertical member 65 and the extending end of the vertical member 66 parallel to the longitudinal member 63. This upper member 67, the longitudinal member 63, the vertical member 65 and the vertical member 66 form a rectangular frame generally perpendicular to the rectangular frame formed by the longitudinal member 63, longitudinal member 64, the lower member 61 and the lower member 62.

Extending parallel to the lower member 61 from one end of the upper member 67 is a lateral member 68 and extending parallel to the lower member 62 from the other end of the upper member 67 is a lateral member 69. Extending from the vertical member 65 intermediate between the lower member 61 and the lateral member 68 and parallel to the lateral member 68 is an intermediate member 70 and extending from the vertical member 66 intermediate between the lower member 62 and the lateral member 69 and parallel to the lateral member 69 is an intermediate member 71. The extending end of the lateral member 68 and the extending end of the intermediate member 70 are joined by a short vertical member 72. This short vertical member 72 is parallel to the vertical member 65 and with the vertical member 65 the lateral member 68 and the intermediate member 70 forms a rectangular frame at one end of the frame A. The extending end of the lateral member 69 is joined to the extending end of the intermediate member 71 by a short vertical member 73. The short vertical member 73 is parallel to the vertical member 66 and with the vertical member 66, the lateral member 69, and the intermediate member 71 forms a rectangular frame at the second end of the frame A.

A mounting plate 74 is fixedly attached to and extends between the short vertical member 72 and the short vertical member 73 and an upper support member 75 extends from the lateral member 68 to the lateral member 69 parallel to and between the mounting plate 74 and the upper member 67. Similarly, an intermediate support member 78 extends from the intermediate member 70 to the intermediate member 71 parallel to the plate of the mounting plate 74. The support member 78 is in the same vertical plane as the upper support member 75 and seven support struts similar to struts 79′, 80′, 81′, 82′, 83′, 84′, 85′ shown in FIG. 4 extend between the upper support member 75 and the intermediate support member 78. The support strut 79 is between one end of the upper support member 75 and the corresponding end of the intermediate support member 78, the support strut 85 is between the other end of the upper support member 75 and the corresponding end of the intermediate support member 78, and the support struts 80, 81, 82, 83 and 84 are equally spaced between the support struts 79 and 85.

The lower member 61 is shorter than the intermediate member 70 and the ends of the lower member 61 and the intermediate member 70 remote from the vertical member 65 are joined by a base member having a vertical segment 86 and an inclined segment 87. Similarly, the lower member 62 is shorter than the intermediate member 71, the ends of the lower member 62 and the intermediate member 71 remote from the vertical member 66 are joined by base member having a vertical segment 88 and an inclined segment 89.

A plate 90 is fixedly attached to the vertical segment 86 and the inclined segment 87 and a plate 91 is fixedly attached to the vertical segment 88 and the inclined segment 89. The outer edge 92 of the plate 90 remote from the vertical segment 86 and the outer edge 93 of the plate 91 remote from the vertical segment 88 are parallel to the vertical plane as the mounting plate 74.

Extending from the outer edge 92 of the plate 90 is a first drum bracket 94 and extending from the outer edge 93 of the plate 91 is a second drum bracket 95. The axle 96 of the substantially horizontal drum extends between and through the first drum bracket 94 and the second drum bracket 95. The vertical distance between a horizontal plane containing the longitudinal member 64 and the center line of the second drum bracket 95 is smaller than the vertical distance between this same plane and the center line of the first horizontal drum bracket 94. Thus, the drum axle 96 extends downward at an angle to a plane containing the longitudinal members 63 and 64 from the first drum bracket 94 to the second horizontal drum bracket 95.

Six vertical drum axles 97, 98, 99, 100, 101 and 102 are rotatably attached to the mounting plate 74. The vertical drum axles 97, 98, 99, 100, 101 and 102 are more or less equally distributed along the length of the mounting plate 74 and each vertical drum axle 97, 98, 99, 100, 101, and 102 is attached to the back 149 of the mounting plate 74 by an upper bracket 103 and a lower bracket 104. Each vertical drum axle 97, 98, 99, 100, 101, or 102 has its center line perpendicular to a plane containing the longitudinal members 63 and 64 and it is to the lower end of each vertical drum axle 97, 98, 99, 100, 101 or 102 that the hub 105 of a vertical drum is fixedly attached.

The end of the horizontal drum axle 96 extending through the horizontal drum bracket 94 has a drive pulley 106 fixedly attached to it. This drive pulley 106 is connected by double belting 107 to a small speed pulley 108 at the end of a pulley axle 109 extending from a bracket 110 fixedly attached to the short vertical member 72 between the short member 72 and the vertical member 65. A large speed pulley 111 is fixedly mounted upon the axle 109 with the small speed pulley 108 and double belting 112 extends between and around the large speed pulley 111 and the motor pulley 113 of a motor 114 mounted on the vertical struts similar to struts 79' and 80' in FIG. 4. The motor 114 is known type and its operation will result in the rotation of the horizontal drum axle 96.

Figure 4:
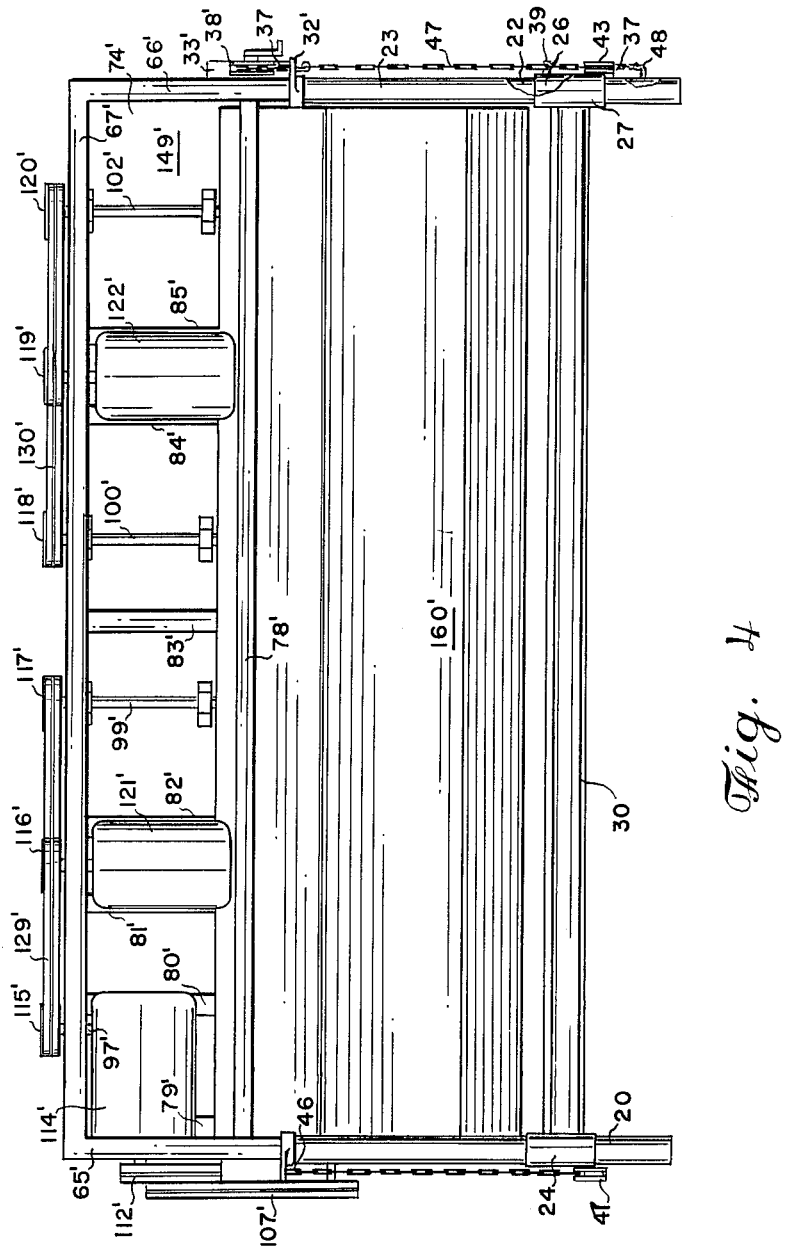
FIG. 4 is a side elevational view of the chicken picking machine.
Figure 5:
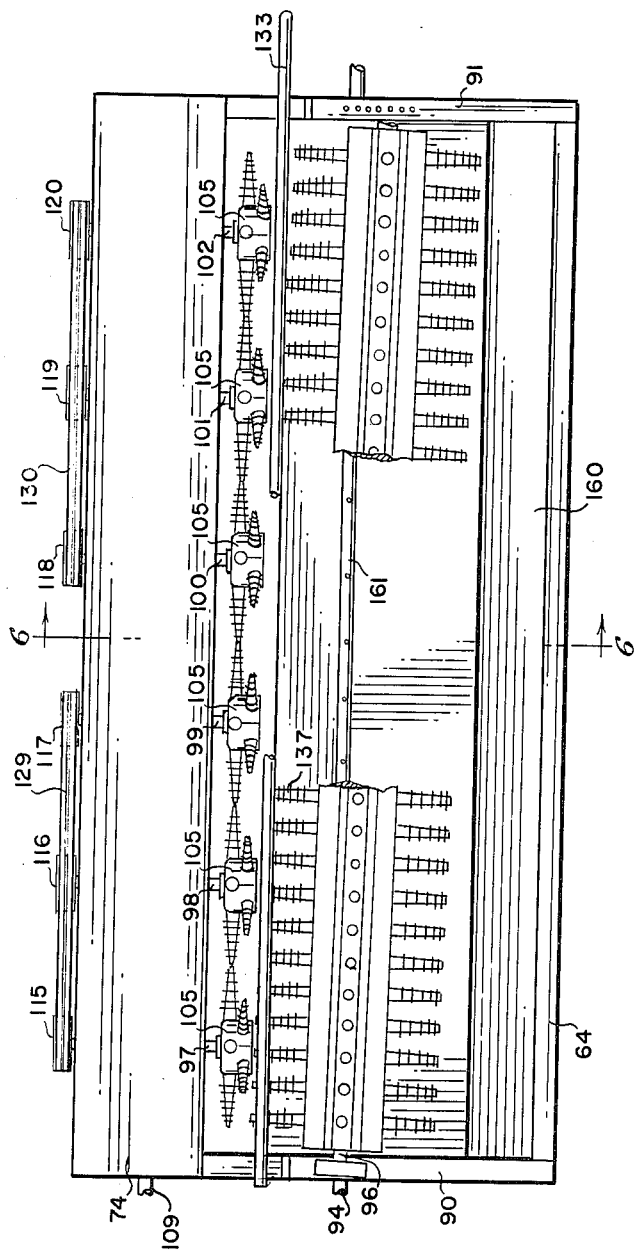
FIG. 5 is a side elevational view of the right picking frame substantially as it would be viewed in line 5—5 in FIG. 1 with parts broken away.
Figures 6, 7:
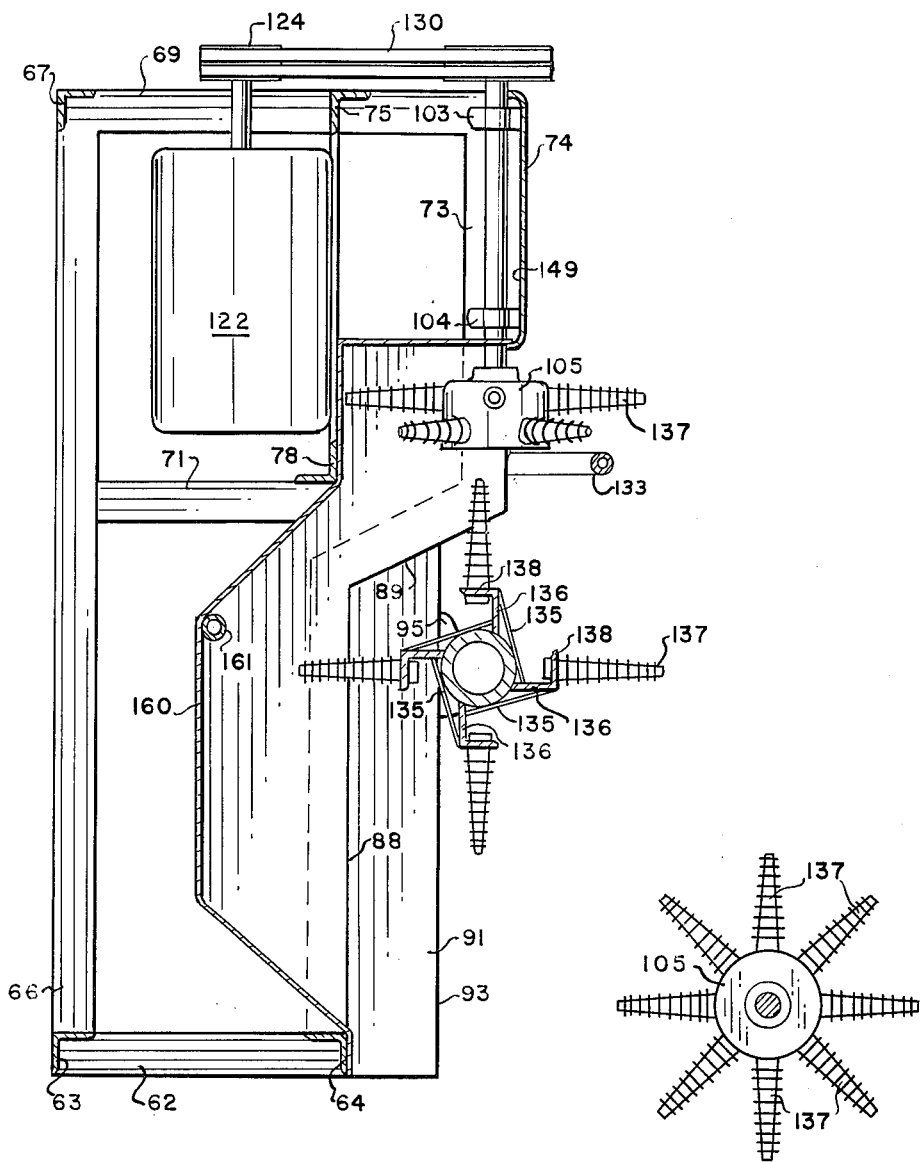
FIG. 6 is a cross sectional view of the right picking frame taken in line 6—6 in FIG. 5.
FIG. 7 is a top plan view of one of the plurality of vertical drums.

A pulley 115 is attached to the upper end of the vertical drum axle 97, a pulley 116 is attached to the upper end of the vertical drum axle 98, a pulley 117 is attached to the upper end of the vertical drum axle 99, a pulley 118 is attached to the upper end of the vertical drum axle 100, a pulley 119 is attached to the upper end of the vertical drum axle 101, and a pulley 120 is attached to the upper end of the vertical drum axle 102. A first vertical drum motor 121 is fixedly attached to a support strut similar to strut 81' in FIG. 4 and a second vertical drum motor 122 is fixedly attached to a support strut similar to strut 84' as shown in FIG. 4. The first vertical drum motor 121 drives a motor pulley 123 and the second vertical drum motor 122 drives a motor pulley 124. Mounted on the first vertical drum motor 121 adjacent to the motor pulley 123 is a slack pulley 125 and mounted on the second vertical drum motor 122 adjacent to the motor pulley 124 is a slack pulley 126.

A double belt 129 extends from the pulley 117 to and around the motor pulley 123, thence between the motor pulley 123 and the slack pulley 125 to the pulley 115, thence around the pulley 115 and against the pulley 116 to the pulley 117, and thence around the pulley 117 to its point of beginning. Similarly, a second double belt 130 extends from the pulley 118 to and around the motor pulley 124, thence between the motor pulley 124 and the slack pulley 126 to the pulley 120, thence against the pulley 119 to the pulley 118, and thence around the pulley 118 to its point of beginning. When the first vertical drum motor 121 and the second vertical drum motor 122 are operated, this arrangement of the double belts 129 and 130 results in the pulleys 115, 117 and 119 rotating in a counterclockwise direction as viewed from above in FIG. 1 and in the pulleys 116, 118 and 120 rotating in a clockwise direction as viewed from above in FIG. 1.

Extending through the short vertical member 72 and adjacent to intermediate member 70 is a first guide bar pin 131 and extending through the short vertical member 73 and adjacent to the intermediate member 71 is a second guide bar pin 132. A peg (not shown) inserted through the first guide bar pin 131 and into one of a plurality of holes (not shown) in the intermediate member 70 adjustably fixes the extending length of the first guide bar pin 131. Similarly, another peg (not shown) inserted through the second guide bar pin 132 and into one of a plurality of holes (not shown) in the intermediate member 71 adjustably fixes the extending length of the second guide bar pin 132. A guide bar 133 extends between the extending ends of the first guide bar pin 131 and the second guide bar pin 132. This guide bar 133 extends beyond the plane of the mounting plate 74 and with guide bar 133' of the left picking frame B serves to define a channel between the right picking frame A and the left picking frame B. The guide bars 133 and 133' extend beyond the frame A and B in a curving manner so as to form a throat which will guide a chicken moving toward the picking machine along a line of motion 134 into the space between the guide bars 133 and 133'.

The horizontal drum comprises four plates 135 extending the length of the horizontal drum axle 96 between the horizontal drum brackets 94 and 95 and four radial members 136 extending from the horizontal drum axle 96 between the edges of the plates 135. The radial members 136 extend the length of the horizontal drum axle 96 between the horizontal drum brackets 94 and 95 and each radial member 136 has a finger plate 138 perpendicular to a radius extending from the center line of the horizontal drum axle 96. A plurality of picking fingers 137 are distributed along the length of each finger plate 138 between the brackets 94 and 95. The picking fingers 137 extend through the finger plates 138 and the center line of each picking finger 137 more or less coincides with a radius extending from the center line of horizontal drum axle 96. The finger plates 138 are displaced from the horizontal drum axle 96 and the plates 135 and this displacement of the finger plates 138 permits picking fingers 137 to be easily inserted into or removed from the horizontal drum.

The hub 105 of each vertical drum resembles a cylinder and four picking fingers 137 are equally spaced about the circumference of the upper portion of the hub 105 and four picking fingers 137 are equally spaced about the circumference of the lower portion of hub 105. The positions of the picking fingers 137 extending from the upper portion of the hub 105 are displaced from the positions of the picking fingers 137 extending from the lower portion of the hub 135 to the extent necessary to distribute the eight picking fingers 137 equally about the circumference of the hub 105.

A pan 160 is mounted between the longitudinal member 64 and the mounting plate 74 and the feathers removed from a bird are prevented by the pans 160 and 160' from spreading about the machine. Perforated water pipes 161 and 161' extend the lengths of the pans 160 and 160' and water sprays from the pipes 161 and 161' to wet down the chickens passing between picking frames A and B.

Operation

Figure 2:
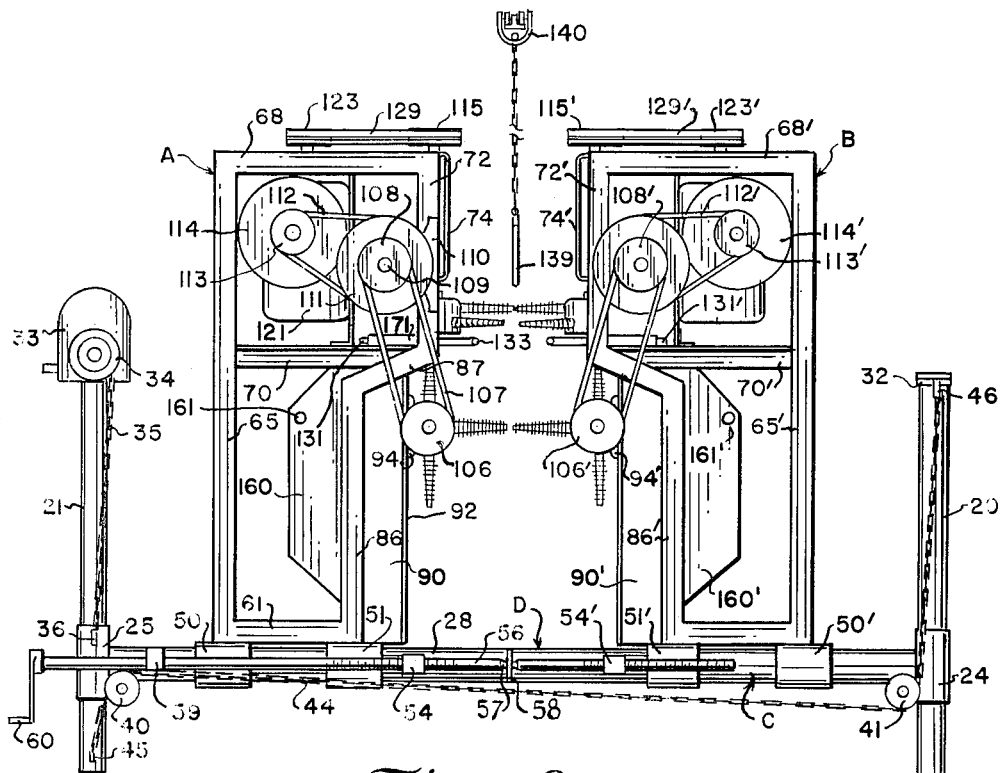
FIG. 2 is an end elevational view of the chicken picking machine showing the two picking frames mounted on the vertically adjustable carriage.
Figure 3:
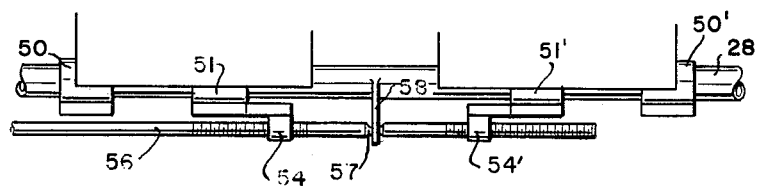
FIG. 3 is a fragmentary top plan view of the lateral positioning mechansim for the two picking frames.

The motor 114 of the right picking frame A drives the horizontal drum axle 96 in a clockwise direction as viewed in FIGURE 2 and the motor 114' of the left picking frame B drives horizontal drum axle 96' in a counterclockwise direction as viewed in FIGURE 2. The first vertical drum motor 121' of the left picking frame B drives the pulley 115' in a counterclockwise direction as viewed in FIG. 1, the pulley 116' in a clockwise direction as viewed in FIG. 1, and the pulley 117' in a counterclockwise direction as viewed in FIG. 1. Similarly, the second vertical drum motor 122' of the left picking frame B drives the pulley 118' in a clockwise direction as viewed in FIG. 1, the pulley 119' in a counterclockwise direction as viewed in FIG. 1, and the pulley 120' in a clockwise direction as viewed in FIG. 1.

When a chicken suspended head lowermost from a shackle 139 carried by a conveyor belt of conventional known type 140 passes between the right picking frame A and the left picking frame B along the line of motion 134 indicated in FIG. 1, its neck and shoulders will be engaged by the picking fingers 137 being rotated toward the chicken and downward by the horizontal drum axle 96 of the right picking frame A and horizontal drum axle 96' of the left picking frame B. Since the horizontal drum axles 96 and 96' are inclined upward along the direction of motion of the chicken between the right picking frame A and the left picking frame B, the picking fingers 137 will progressively advance upward along the neck and shoulders of the bird as the bird passes progressively between the right picking frame A and the left picking frame B. It has been found that the downward motion of the picking fingers 137 resulting from the rotation of the horizontal drum axles 96 and 96' and the progressive upward movement of the picking fingers 137 along the neck and shoulders of the bird as it passes between the right picking frame A and the left picking frame B will completely remove all feathers from the neck and shoulders of the bird.

Moreover, the downward motion of the fingers 137 on either side of the bird as it passes between the right picking frame A and the left picking frame B resulting from the rotation of the horizontal drum axles 96 and 96' urges the bird downward away from the shackle 139. This maintains the bird in a relatively constant position with respect to the planes of motion of the picking fingers 137 extending from hubs 105 of the vertical drums. The chicken is passed between the right picking frame A and the left picking frame B at that height which places the hocks of the chicken substantially in the horizontal planes in which the picking fingers 137 extending from the hubs 105 move. The hubs 105 are driven in such a manner that the hocks of the bird are engaged by picking fingers 137 driven by vertical drum pulleys 115, 116', 117, 118', 119 and 120' in a direction opposite to the direction the bird is travelling and are engaged by picking fingers 137 driven by vertical drum pulleys 115', 116, 117', 118, 119' and 120 in the same direction as the bird is travelling.

Thus, as the bird passes between the right picking frame A and the left picking frame B, the hocks of the bird are constantly engaged by picking fingers 137 moving in opposite directions and are alternately engaged by picking fingers 137 moving in a direction opposite to the chicken's direction of motion and picking fingers 137 moving in the same direction as its direction of motion. It has been found that this picking finger motion completely removes all feathers from the hocks of the bird as it passes between the right picking frame A and the left picking frame B.

It will be obvious to those skilled in the art that many variations may be made in the embodiments here chosen for the purpose of illustrating the present invention without departing from the scope thereof as defined by the appended claims.

What is claimed as the invention is:

1. In a poultry picking machine, a main frame; a pair of picking frames adjustably supported on said frame for vertical adjustment at each end and for independent lateral adjustment of the distance between said picking frames; a horizontal drum on each of said picking frames; a first series of vertical drums rotatably mounted on each of said picking frames with the vertical drums on one picking frame facing the vertical drums on the other picking frame; a second series of vertical drums rotatably mounted on each of the said picking frames with the vertical drums of each second series interspersed alternately among the vertical drums of the first series of vertical drums on the same picking frame and with the vertical drums of the second series on one picking frame facing the vertical drums of the second series on the other picking frame; means mounted on each picking frame driving the first series of vertical drums on the said picking frames in the same rotational direction, said means mounted on said picking frames driving the vertical drums of the second series of drums mounted thereon in a direction opposite the direction of rotation of the first series of drums mounted thereon; means for rotating the horizontal drums in opposite directions of rotation; and resilient picking fingers carried by the vertical drums of each first and each second series and by the horizontal drums for picking feathers from poultry passed between the picking frames.

2. In a poultry picking machine, a main frame; a pair of picking frames adjustably supported on said main frame for vertical adjustment at each end and for adjustment of the distance between said picking frames; a horizontal drum axle on each of said picking frames, said horizontal drum axles being normally inclined from the horizontal and juxtaposed in substantially parallel relation both horizontally and vertically with respect to each other; a first series of vertical drum axles rotatably mounted on each of the said picking frames; a second series of vertical drum axles rotatably mounted on each of the said picking frames with the vertical drum axles of each second series interspersed alternately among the vertical drum axles of each first series of vertical drum axles; means on said picking frames driving the first series of vertical drum axles on one picking frame and the first series of vertical drum axles on the other picking frame in the same rotational direction, said means driving the second series of vertical drum axles on each picking frame in a direction opposite to the direction of rotation of the first series of vertical drum axles; means for rotating the horizontal drum axles in opposite directions of rotation; and resilient picking fingers carried by the vertical drum axles of each first and each second series and by the horizontal drum axles for picking feathers from poultry passed between the picking frames.

3. In a poultry picking machine, a main frame; a pair of picking frames adjustably supported on said main frame for vertical adjustment at each end and for adjustment of the distance between said picking frames; a horizontal drum axle on each of said picking frames; a first series of vertical drum axles rotatably mounted on each of the said picking frames; a second series of vertical drum axles rotatably mounted on each of the said picking frames with the vertical drum axles of each second series interspersed alternately among the vertical drum axles of each first series of vertical drum axles; means on said picking frames driving the first series of vertical drum axles on one picking frame and the first series of vertical drum axles on the other picking frame in the same direction, said means driving the second series of vertical drum axles on each picking frame in a direction opposite to the direction of rotation of the first series of vertical drum axles mounted thereon; means for rotating the horizontal drum axles in opposite directions of rotation; and resilient picking fingers carried by the vertical drum axles of each first and each second series and by the horizontal drum axles for picking feathers from poultry passed between the picking frames.

4. In a poultry picking machine, a main frame; a pair of picking frames adjustably supported on said main frame for vertical adjustment at each end and for lateral adjustment of the distance between said picking frames; a horizontal drum rotatably mounted on each of said picking frames, said horizontal drums being normally inclined from the horizontal and juxtaposed in substantially parallel relation both horizontally and vertically with respect to each other; a first series of vertical drums mounted on each of said picking frames; a second series of vertical drums mounted on each of said picking frames with the vertical drums of each second series mounted alternately with the vertical drums of each first series and with the vertical drums of each first series facing the vertical drums of the other first series and with the vertical drums of each second series facing the vertical drums of the other second series; means on each picking frame driving the first series of vertical drums on one picking frame in the same rotational direction as the first series of drums on the other frame, said means driving the vertical drums of each second series of vertical drums in a direction opposite the direction of rotation of the first series of vertical drums on the same picking frame; means for rotating the horizontal drums in opposite directions; and resilient picking fingers carried by the vertical drums of each first and said second series and by the horizontal drums for picking feathers from poultry passed between the frames.

5. In a poultry picking machine, a main frame; a pair of picking frames adjustably supported on said main frame for vertical adjustment at each end and lateral adjustment of the distance between said picking frames; a horizontal drum on each of said picking frames; a first series of vertical drums mounted on each of said picking frames with the vertical drums of said first series on one picking frame facing the vertical drums of said first series on the other picking frame; means on each picking frame driving the first series of vertical drums on one picking frame in the same rotational direction as the first series of vertical drums on the other picking frame; a second series of vertical drums mounted on each picking frame with the vertical drums of the second series on one picking frame facing the vertical drums of the second series on the other picking frame and means on each picking frame for driving the vertical drums of each second series of vertical drums in a direction opposite the direction of rotation of the first series of vertical drums mounted thereon; means for rotating the horizontal drums in opposite directions; and resilient picking fingers carried by the vertical drums of each first and each second series of vertical drums and by the horizontal drums for picking feathers from poultry passed between the frames.

6. A poultry picking machine including a plurality of pairs of transversely spaced picking members defining a path of travel for poultry through said machine, said picking members being rotatably mounted on axes that are substantially perpendicular to said path of travel, and a rotatable picking member positioned below each of said first mentioned picking members and in said path of travel for said poultry.

7. A poultry picking machine including a plurality of pairs of transversely spaced picking members defining a path of travel for poultry through said machine, said picking members being rotatably mounted on axes that are substantially perpendicular to said path of travel, a rotatable longitudinally extending picking member positioned below said first mentioned picking members and in said path of travel for said poultry, and means for rotating said picking members.

8. A poultry picking machine including a pair of longitudinally extending drums rotatably mounted on substantially horizontal parallel shafts, a plurality of transversely spaced vertically extending drums rotatably mounted on substantially vertical shafts defining a passage for poultry through said machine, at least one vertically extending drum being positioned over each longitudinal drum, and means for rotating said drums.

9. A poultry picking machine including a pair of longitudinally extending drums rotatably mounted on substantially horizontal parallel shafts, a plurality of transversely spaced vertically extending drums rotatably mounted on substantially vertical shafts defining a passage for poultry through said machine, at least one vertically extending drum being positioned over each longitudinal drum, and means for rotating the drums of each pair of transversely spaced vertically extending drums in opposite directions.

10. A poultry picking machine including a pair of longitudinally extending drums rotatably mounted on substantially horizontal parallel shafts, a plurality of transversely spaced vertically extending drums rotatably mounted on substantially vertical shafts defining a passage for poultry through said machine, at least one vertically extending drum being positioned over each longitudinal drum, means for rotating the drums of each pair of transversely spaced vertically extending drums in opposite directions and each adjoining drum in opposite directions, and means for rotating said longitudinally extending drums in opposite directions.

11. A poultry picking machine including a pair of longitudinally extending drums rotatably mounted on substantially horizontal parallel shafts, each of said longitudinally extending drums including a plurality of radially extending flexible picking fingers, a plurality of transversely spaced vertically extending drums rotatably mounted on substantially vertical shafts defining a passage for poultry through said machine, each of said vertically extending drums including a plurality of radially extending flexible picking fingers, at least one vertically extending drum being positioned over each longitudinal drum, means for rotating the drums of each pair of transversely spaced vertically extending drums in opposite directions and each adjoining drum in opposite directions, and means for rotating said longitudinally extending drums in opposite directions.

References Cited by the Examiner

UNITED STATES PATENTS

| | | | |
|---|---|---|---|
| 2,080,198 | 5/1937 | Brandenburg | 15—3.16 |
| 2,908,033 | 10/1959 | Zebarth | 17—45 |
| 3,044,108 | 7/1962 | DeLong | 17—11.1 |
| 3,074,103 | 1/1963 | Roth et al. | 17—45 |

FOREIGN PATENTS 1,262,371 4/1961 France.
(Corresponding U.S. Zebarth et al., 3,145,415, Aug. 25, 1964.)

SAMUEL KOREN, *Primary Examiner.*
LUCIE H. LAUDENSLAGER, *Examiner.*